(12) United States Patent  (10) Patent No.: US 7,997,591 B2
Arthur  (45) Date of Patent: Aug. 16, 2011

(54) CHASSIS WITH RETRACTABLE WHEELS

(75) Inventor: Joseph I Arthur, Palm Bay, FL (US)

(73) Assignee: Retrac Enterprises, Inc., Palm Bay, FL (US)

( * ) Notice: Subject to any disclaimer, the term of this patent is extended or adjusted under 35 U.S.C. 154(b) by 386 days.

(21) Appl. No.: 12/326,824

(22) Filed: Dec. 2, 2008

(65) Prior Publication Data

US 2009/0160147 A1    Jun. 25, 2009

Related U.S. Application Data

(63) Continuation-in-part of application No. PCT/US2007/008364, filed on Apr. 5, 2007.

(51) Int. Cl.
*B62B 1/00* (2006.01)
(52) U.S. Cl. ............................................. 280/37; 280/35
(58) Field of Classification Search ............. 280/47.315, 280/47.371, 37, 655, 47.26, 644, 651, 654, 280/655.1, 35; 190/18 A, 104, 115; 16/47, 16/18 B
See application file for complete search history.

(56) References Cited

U.S. PATENT DOCUMENTS

| 2,463,713 | A | 3/1949 | Partiot |
| 3,141,680 | A | 7/1964 | McCord et al. |
| 3,376,047 | A | 4/1968 | Schuster |
| 4,254,850 | A | 3/1981 | Knowles |
| 4,588,055 | A | 5/1986 | Chen |
| D336,365 | S | 6/1993 | Huang |
| 5,303,805 | A | 4/1994 | Hauser |
| D357,354 | S | 4/1995 | Marchwiak et al. |
| 5,431,262 | A | 7/1995 | Rekuc et al. |
| 5,513,873 | A | 5/1996 | Chen |
| 5,524,737 | A | 6/1996 | Wang |
| 5,533,231 | A | 7/1996 | Bai |
| 5,564,538 | A | 10/1996 | Sadow |

(Continued)

FOREIGN PATENT DOCUMENTS

GB    GB 2 124 589 A    2/1984

(Continued)

OTHER PUBLICATIONS

"Samsonite A61009062-Scope by Marc Newson 25" Duffel Bag, http://www.luggage.com/asp/show_detail.asp?sku=FE1153 &PiID=1586302&refid=BR52-FE1153_1586302#ProdDetails.

(Continued)

*Primary Examiner* — Hau V Phan
(74) *Attorney, Agent, or Firm* — Webb IP Law Group; Jason P. Webb; Danny Y. H. Cheng

(57) ABSTRACT

There is a chassis with retractable wheels, wherein the chassis includes a housing. The chassis may also include a chassis sled slidably disposed within the housing. In addition, the chassis may include a pair of lever arms, each said lever arm being disposed in the lower portion of the housing. Furthermore, the chassis includes a pair of mounting wheels, a fender configured to cover the wheels openings in a retracted position, and a web joining the fender to the wheel lever, and having a second end. The chassis with retractable wheels includes a chassis sled, wherein the chassis sled includes an isosceles trapezoid configuration. The chassis sled also includes a pair of receiving members pivotly attached to the first end of the pair of lever arms. The chassis further includes a separation panel attached to the housing configured to conceal the mechanical components of the chassis with retractable wheels.

14 Claims, 11 Drawing Sheets

U.S. PATENT DOCUMENTS

| | | | |
|---|---|---|---|
| 5,813,503 A * | 9/1998 | Chang | 190/18 A |
| 6,179,176 B1 | 1/2001 | Saggese et al. | |
| 6,220,412 B1 | 4/2001 | Lin | |
| 6,289,554 B1 | 9/2001 | Wang | |
| 6,360,400 B1 | 3/2002 | Chang | |
| 6,367,602 B1 | 4/2002 | Chang | |
| 6,454,065 B1 * | 9/2002 | Chen | 190/18 A |
| 6,550,967 B2 | 4/2003 | Hedaya | |
| 6,604,615 B2 | 8/2003 | Wu | |
| 6,612,411 B2 | 9/2003 | Nykoluk et al. | |
| 7,066,311 B2 | 6/2006 | O'Shea | |
| 7,165,661 B2 | 1/2007 | Miyoshi | |
| 7,237,660 B2 | 7/2007 | Wu | |
| 7,861,834 B2 * | 1/2011 | Gorga et al. | 190/18 A |
| 2002/0125665 A1 | 9/2002 | Cohen | |
| 2004/0163910 A1 | 8/2004 | Lee | |
| 2005/0067244 A1 | 3/2005 | Smith | |
| 2005/0092568 A1 | 5/2005 | Nordstrom et al. | |
| 2005/0236242 A1 | 10/2005 | Fenton et al. | |
| 2006/0196743 A1 | 9/2006 | Lin | |

FOREIGN PATENT DOCUMENTS

| | | |
|---|---|---|
| JP | 6-205704 A | 7/1994 |
| WO | WO2007/145699 | 12/2007 |

OTHER PUBLICATIONS

"Business Gear", Luggage Pros, http://www.luggagepros.com/mpb/05407205.shtml.

* cited by examiner

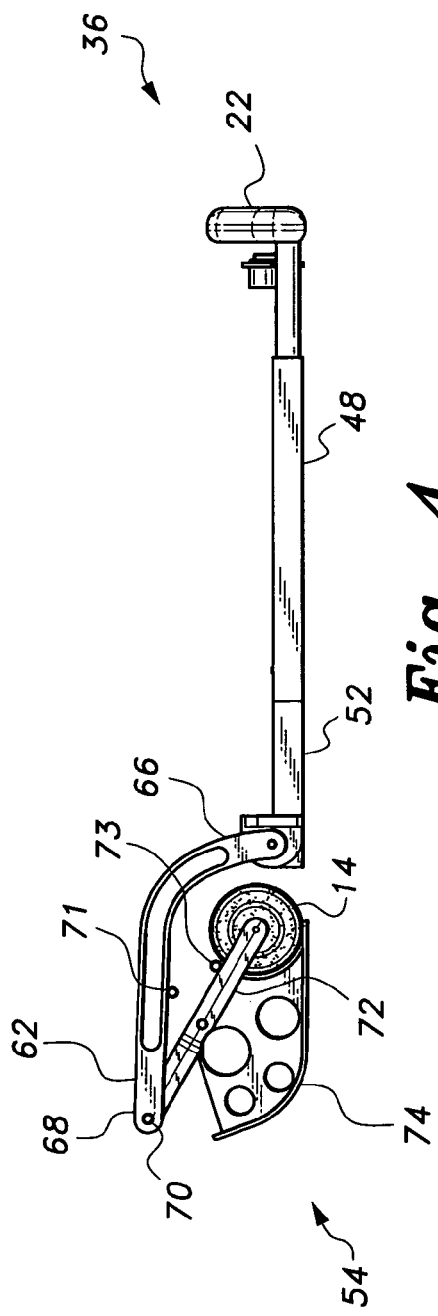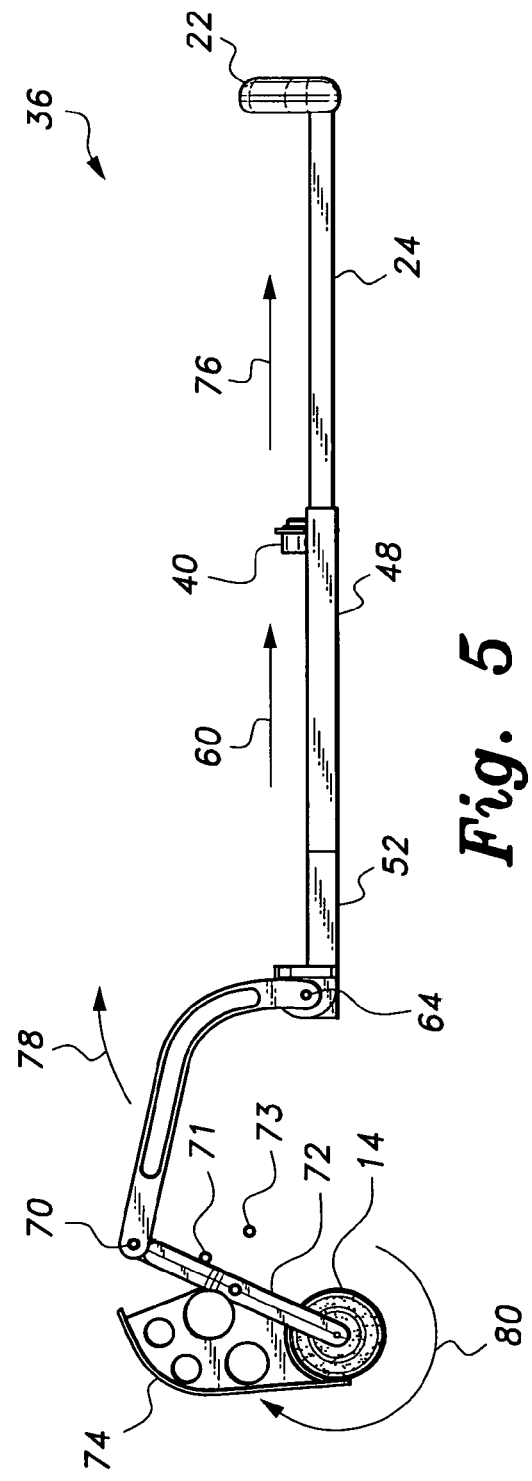

CHASSIS WITH RETRACTABLE WHEELS

CROSS-REFERENCE TO RELATED APPLICATIONS

This application claims priority to PCT/US2007/008364 by Joseph I. Arthur entitled CHASIS WITH RETRACTABLE WHEELS FOR WHEELED PRODUCTS and having an international filing date of 5 Apr. 2007 and a priority date of 6 Jun. 2006, which is incorporated by reference herein in its entirety. This application is a continuation-in-part application of PCT/US2007/008364 by Joseph I. Arthur having an international filing date of 5 Apr. 2007 and a priority date of 6 Jun. 2006. This application is a nationalization of PCT/US2007/008364 by Joseph I. Arthur having an international filing date of 5 Apr. 2007 and a priority date of 6 Jun. 2006. This application claims priority to and incorporates by reference herein in its entirety U.S. Provisional patent application No. 60/811,098 filed on 6 Jun. 2006, by and through PCT/US2007/008364.

BACKGROUND OF THE INVENTION

1. Field of the Invention

The present invention relates to wheeled devices, specifically to a chassis with retractable wheels included into a suitcase, trunk, or other luggage article, or that may be adapted for use as a luggage carrier.

2. Description of the Related Art

Luggage, including suitcases and the like, is often heavy, bulky, and generally unwieldy. Travelers, in particular, often have multiple articles of luggage, which are not easily simultaneously transported by a single person. Although suitcases are frequently provided with wheels, the user must wither hunch over, or otherwise lower his or her arms, in order to grasp the handle of the suitcase while the wheels contact the floor, or stand erect and carry the suitcase, and often project the suitcase, so that the wheel assemblies may be damaged during handling by the airlines, and which may present difficulties when the user wishes to have the suitcase stably positioned on the floor.

A separate luggage carrier with wheels and an extendible handles may be utilized to overcome these problems. However, such carriers have open frames that leave the wheel assemblies of the luggage carriers exposed to damage during handling by the airlines. Thus, a chassis with retractable wheels for luggage or a luggage carrier solving the aforementioned problems is desired. Some improvements have been made in the field. Examples of references related to the present invention are described below, and the supported teachings of each reference are incorporated by reference herein:

U.S. Pat. No. 5,431,262, issued to Rekuc et al., discloses An article of luggage has a handle received in a frame disposed along the interior rear wall of a flexible case to allow the article to be pulled along the ground or floor on wheels mounted in a wheel assembly affixed to the bottom of an article. The bottom plate has a pull-out ledge on which other luggage can be mounted and held in place by an elastic strap which is affixed to the case and can encircle the additional article or be buckled out of the way along the outer rear wall of the case.

U.S. Pat. No. 7,165,661, issued to Miyoshi, discloses A bag mounted with casters has a bag body attached to a base frame mounted with the casters at four corners of a bottom surface thereof. The base frame includes a loading table, and vertically extensible rods with a grip mounted at upper ends thereof. The extensible rods are fixed on one side of the loading table so as to stand on their own. Further, when the grip is raised, the extensible rods are curved or tilted so that the grip moves toward the middle of the loading table. The extensible rods are secured at a position in a retracted state by stoppers so that the grip is positioned at an upper portion of the bag body or above the bag body, and are secured at a position by the stoppers in an extended state so that a height of the grip from the bottoms of the casters is in a range of 60 to 100 cm.

U.S. Pat. No. 5,513,873, issued to Chen, discloses A handle of a push cart includes two rods slidably engaged in two tubes and each having a number of teeth. Two sleeves are secured on top of the tubes and each has a pair of lugs. Two pins are secured between the lugs. A resilient arm has two ends slidably engaged with the pins, the ends each includes a tooth for engaging with the teeth of the rods so as to secure the rods to the tubes. The teeth of the resilient arm are disengaged from the teeth of the rods when the resilient arm is depressed. A fence is secured to the sleeves for preventing the resilient arm from being depressed inadvertently.

U.S. Pat. No. 5,524,737, issued to Wang, discloses A retractable handle and wheel assembly includes a flat handle mounting frame and a circularly arched wheel mounting frame joined together and mounted on the back and bottom panel of a collapsible travel bag. Two wheel holders are respectively fastened to the wheel mounting frame each wheel holder having a wheel coupling portion fitted over a respective recessed hole on the wheel mounting frame to hold a respective wheel by a bearing and a channel bar bearing block fixedly fastened to the handle mounting frame to hold a respective channel bar, with a retractable handle sliding in an out of the channel bars, the retractable handle having two rubber blocks at two adjacent ends for positioning the handle at either end of each channel bar to hold the handle in the collapsed or extended out position.

U.S. Pat. No. 3,376,047, issued to Schuster, discloses a collapsible vehicle for the transportation of tools, suitcases, shopping bags, sport equipment, etc., which includes a frame of isosceles trapezoidal configuration defined by hingedly interconnected member cooperating with a support and a releasable latch, the front and rear members having a total length equal to the combined length of the size of the trapezoid, which is swingable so that the members can lie substantially parallel to one another.

The inventions heretofore known suffer from a number of disadvantages which include being cumbersome, being limited in application, being expensive, being breakable or flimsy, being excessive in size, and being heavy.

What is needed is a chassis with retractable wheels that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available carry-on luggage. Accordingly, the present invention has been developed to provide an innovative piece of carry-on luggage having retractable wheels.

In one embodiment of the invention, there is a chassis with retractable wheels, wherein the chassis may include a housing defining a hollow interior and having a lower portion having a pair of wheel openings formed therethrough. The chassis may also include a chassis sled slidably disposed within the housing. In addition, the chassis may include a pair of lever arms, each said lever arm being disposed in the lower portion of the housing, each of said lever arms having a first end pivotally attached to said chassis sled, and having a second end. Furthermore, the chassis may include a pair of mounting wheels, each said mounting wheel having a lower wheel, a fender configured to cover the wheels openings in a retracted position, and a web joining the fender to the wheel lever, the wheel levers having a first end pivotally attached to the second end of one said lever arm and having a second end.

The chassis with retractable wheels may include an axle mounted to the second end of each of the wheel levers and a wheel mounted for rotation on each of the axles. The chassis may also include a pair of rods extending from the lower portion of the housing, the rods defining fulcrums for the wheel levers. The chassis may further include a handle assembly connected to said chassis sled. Moreover, the chassis may include a locking mechanism selectively locking said chassis sled to said housing, said locking mechanism having a locking position and an unlocked position; wherein the wheels pivot to an extended position outside the housing when the handle is pulled from the housing with the locking mechanism in the unlocked position, and pivot to a retracted position when the handle is pushed into the housing.

The chassis with retractable wheels may include wherein the chassis sled may include an isosceles trapezoid configuration defining a chassis sled slideably disposed within the housing. The chassis sled may include a pair of receiving members pivotly attached to the first end of the pair of lever arms. The chassis may further include a separation panel attached to the housing configured to conceal the mechanical components of the chassis with retractable wheels.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIG. 4 is a side view of the internal skeletal structure of the chassis with retractable wheels according to the present invention, shown in a retracted configuration.

FIG. 5 is a side view of the internal skeletal structure of the chassis with retractable wheels according to the present invention, shown in a deployed configuration.

DETAILED DESCRIPTION OF THE INVENTION

Figure 1:
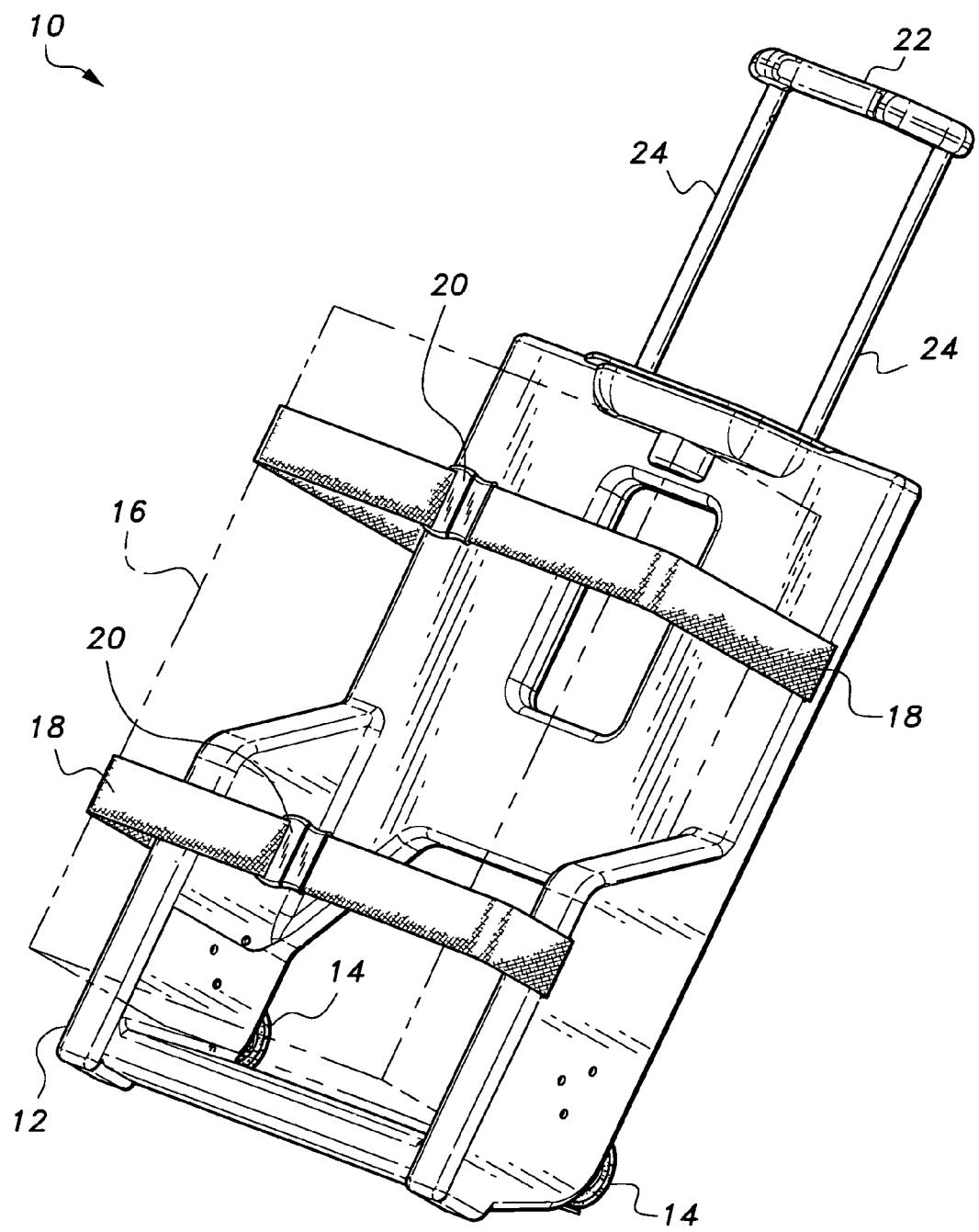
FIG. 1 is an environmental, perspective view of a chassis with retractable wheels according to the present invention configured as a luggage carrier.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Figure 2:
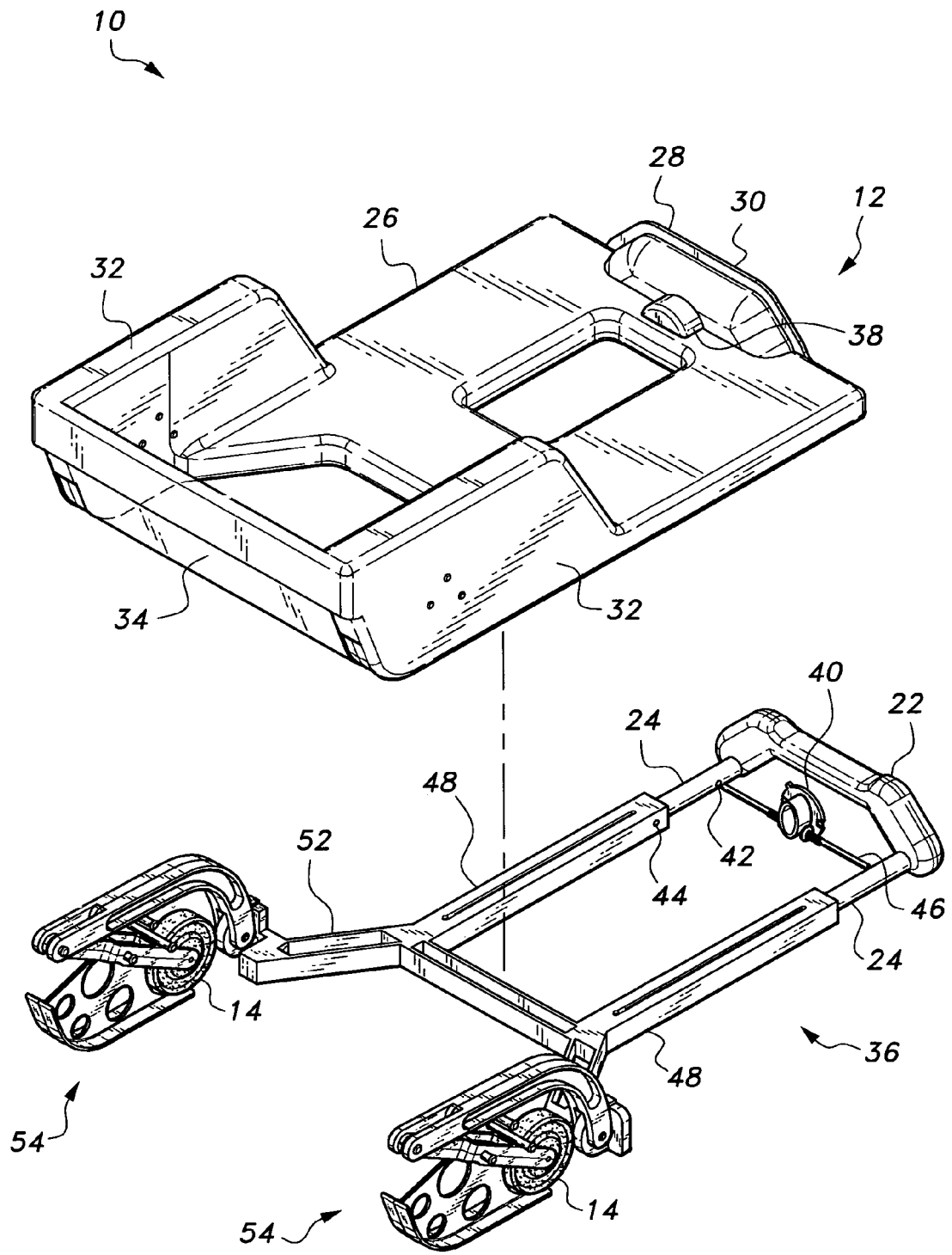
FIG. 2 is partially exploded perspective view of a chassis with retractable wheels for luggage or luggage carrier according to the present invention.
Figure 3A:
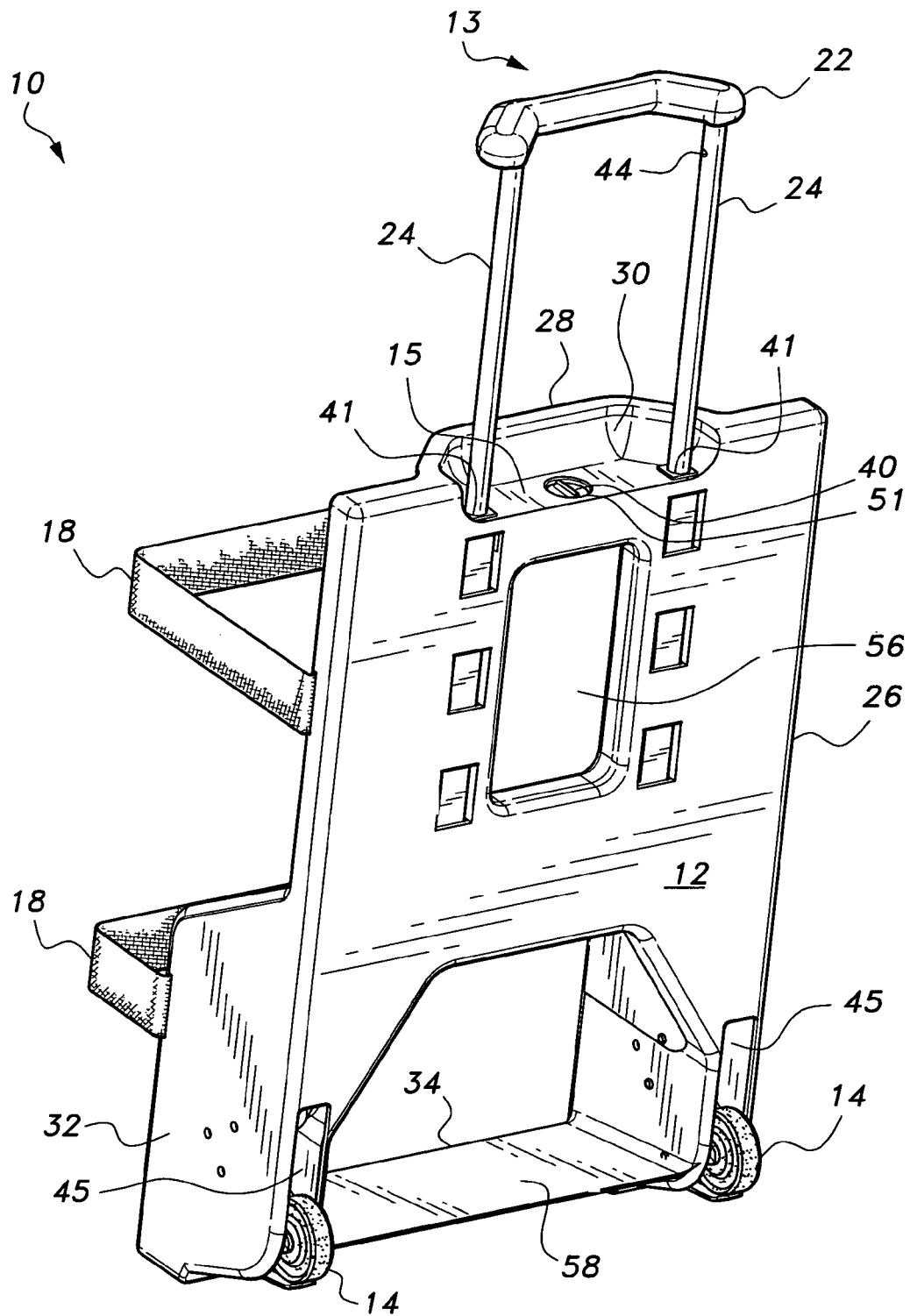
FIG. 3A is a rear perspective view of the chassis with retractable wheels of FIG. 1.

As best shown in FIGS. 1-3A, when configured as a luggage carrier, the chassis includes a housing 12 and a chassis sled 36, which is slidably received within an open interior region of housing 12. As shown in FIGS. 1 and 3A, housing 12 includes a rear wall 26, a pair of lower sidewalls 32, and a lower wall 34 for securely and releasably supporting a piece of luggage, such as exemplary suitcase 16. Housing 12 may be formed from plastic or any other suitable lightweight but structurally strong material.

Figure 3B:
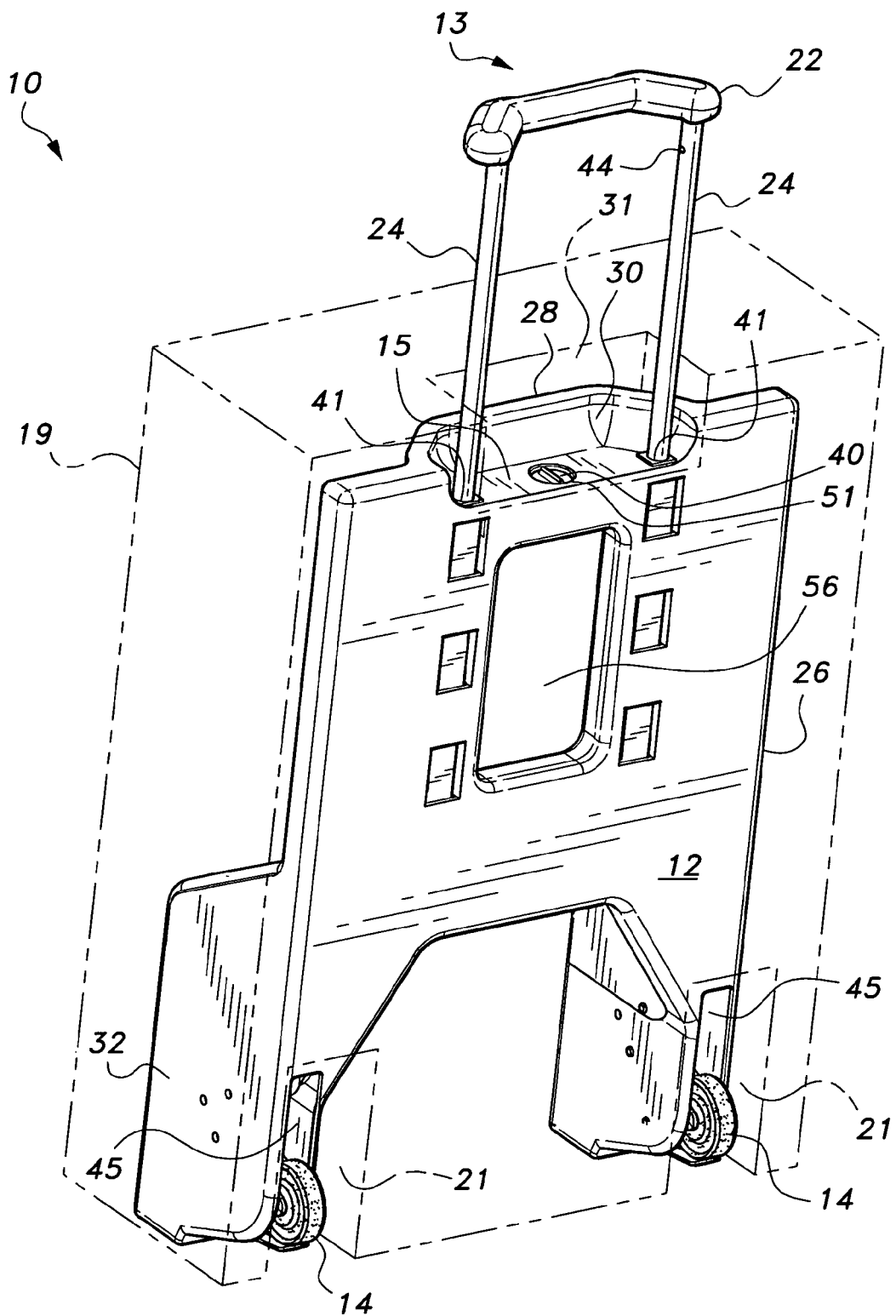
FIG. 3B is a rear perspective view of a chassis with retractable wheels according to the present invention incorporated into an article of luggage.

Alternatively, as shown in FIG. 3B (and to be described in further detail below), the chassis 10 may be incorporated into an article of luggage so that the housing 12 and the chassis sled 36 may be mounted directly within a piece of luggage 19; i.e., rather than providing a separate luggage carrier. The housing, retractable wheels, chassis sled and handle may be formed integrally with the piece of luggage 19, with the wheels 14 projecting through a pair of openings 21 formed in a lower wall of the article of luggage 19, and the handle 13 projecting through an opening 31 formed through an upper wall of the article of luggage.

The chassis 10 is directed towards the combination of the housing 12 with the chassis sled 36, and it is to be understood that this combination may be utilized as a luggage carrier, such as that illustrated in FIG. 1, or may be formed integrally with a piece of luggage, such as exemplary luggage 19, to form a piece of luggage with retractable wheels and a retractable handle. In the embodiment of FIG. 3B, as will be described in detail below, the lower wall 34 of housing 12 is removed, as are straps 18, since, in this embodiment, there is no cargo to be secured to the housing 12.

As shown in FIG. 3A, the rear wall 26 of housing 12 may have an upper opening 56 and a lower opening 58 formed therethrough, providing the user with rear access to the luggage 16, and further decreasing the mass of chassis 10 without a decrease in overall structural stability. Housing 12 further has an upper receptacle portion 28 formed adjacent the upper edge of rear wall 26. Upper receptacle portion 28 defines a recess 30, which releasably receives an upper gripping portion 22 of handle 13 (best shown in FIG. 3A). Lower surface 15 of receptacle portion 28 further has a pair of handle openings 41 formed therethrough, for receiving vertical supports 24 of handle 13. Further, Lower surface 15 has a retracted. Once the wheels are fully retracted, the locking mechanism is engaged to lock the chassis sled in the retracted position relative to the housing.

The lower portion of rear wall 26 has a pair of wheel openings 45 formed therethrough, allowing a pair of wheels 14 to at least partially project out of housing 12 when chassis 1—is in a deployed configuration, as will described in further detail below. As best shown in FIG. 1, a pair of adjustable straps 18 may be mounted to laterally opposed side edges of housing 12 for securing luggage 16 thereto. Straps 18 may include buckles 20 or any other suitable means for adjusting the length of straps 18.

Figure 7:
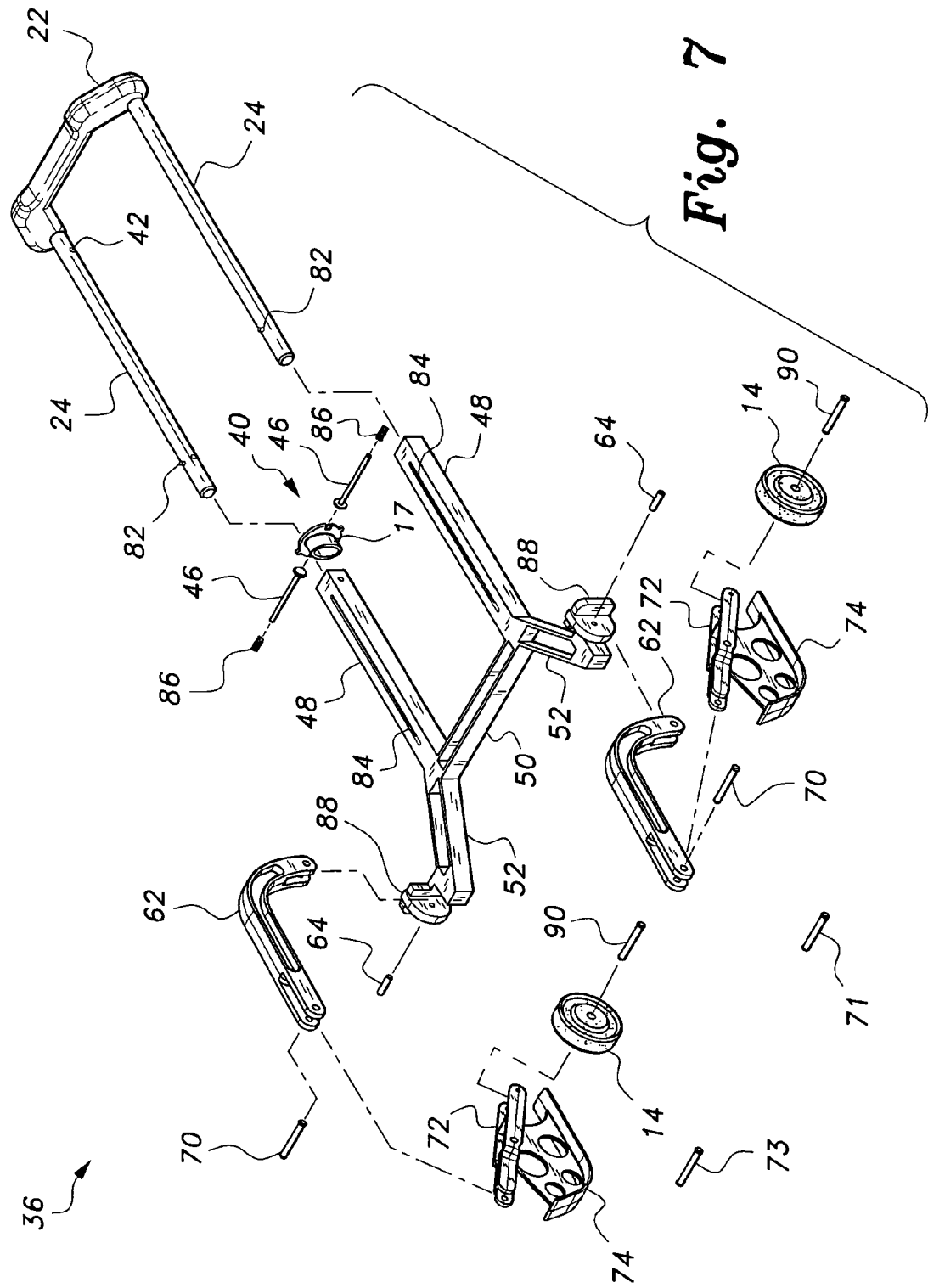
FIG. 7 is an exploded perspective view of the internal skeletal structure of the chassis with retractable wheels according to the present invention.

As best shown in FIGS. 2 and 7, the internal skeletal structure 36 includes a pair of tubes 48 which slideably receive vertical supports 24 of handle 13. As shown in FIG. 7, each vertical support 24 has a projecting member 82, e.g., a guide pin (which may be a spring-biased detent pin), formed on a lower portion thereof, which is received within a corresponding slot 84 formed through a front surface of the respective tube 48. Each slot extends in a substantially longitudinal direction. The sliding engagement of projection members 82 with slots 84 formed through a front surface of the respective tube 48. Each slot extends in a substantially longitudinal direction. The sliding engagement of projecting members 82 with slots 84 maintains proper alignment of handle 13 and prevents the accidental removal of handle 13 from chassis 10, limiting the travel of vertical supports 24 and handle 13 during both extension and retraction of the wheels.

Tubes 48 are joined to one another, at their respective lower ends, by a transverse member or horizontal support 50, which is mounted between the respective lower ends and extends in the lateral direction. A pair of angled struts 52 are mounted to the lower ends of tubes 48 and project downwardly and outwardly therefrom, as shown. Tubes 48, transverse member 50, and struts 52 together form a chassis sled. A mounting plate 88 is joined to the lower end of each of angled struts 52 for the pivotal mounting of a lever arm 62 preferably have a substantially arcuate contour, as shown, and project downwardly from mounting plates 88.

As shown in FIGS. 4 and 5, the upper end 66 of each lever arm 62 is pivotally mounted to the corresponding mounting plate 88 by a pivot pin 64 or the like. The lower end 68 each lever arm 62 is pivotally joined to a corresponding wheel assembly 54 by a pivot pin 70 or the like. Each wheel assembly 54 includes a fender 74, which is mounted to a wheel lever 72 by a web. A lower end of each wheel lever 72 has a respective wheel 14 attached thereto by an axle 90, the wheel 14 being mounted for rotation on axle 90.

Figure 6:
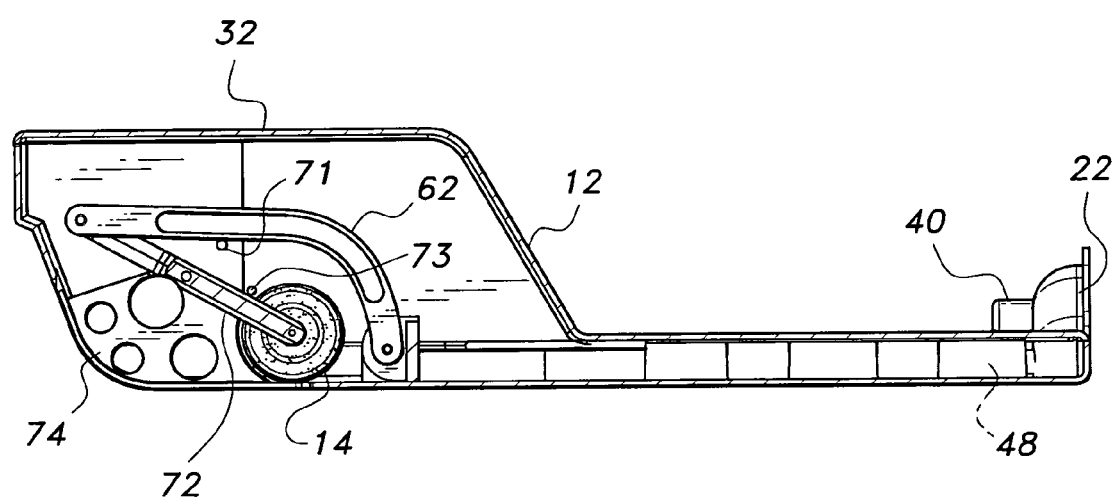
FIG. 6 is a partial side view in section of the chassis with retractable wheels according to the present invention, shown in the retracted configuration of FIG. 4.

FIGS. 4 and 6 illustrate the luggage chassis 10 in a retracted configuration, with wheels 14 being fully received within housing 12. As shown in FIG. 6, the finder 74 is contoured to provide stable contact with a lower rear inner wall of housing 12 when in the retracted state. A pair of horizontal rods 71, 73 are positioned within the lower portion of housing 12, with each rod 71, 73 extending in the lateral direction. In the retracted configuration, a central portion of each lever arm 62 rests on horizontal rod 71 and a lower portion of each wheel lever 72 is positioned adjacent horizontal rod 73.

To deploy the wheels 14m the user pulls upwardly on the upper gripping portion 22 of handle 13 until the vertical supports 24 fully extend and the projecting member 82 reaches the top of the corresponding slot 82 reaches the top of the corresponding slot 84 in the front surface of the tubes 48, as shown in FIG. 7. As the user continues to pull upwardly on the handle 13, the upward force is communicated through the vertical supports 24 to the tubes 48 causing the tubes 48 (and associated chassis sled 36) to move upwardly within housing 12. Since the housing 12 is not locked to the chassis sled at this time, the housing remains stationary while the chassis sled moves upwardly. The movement of the chassis sled 36 from the retracted position to the extended position is shown in FIGS. 4 and 5, with this upward movement of the chassis sled 36 being represented by directional arrows 76 and 60 in FIG. 5. The upward movement of tubes 48 generates movement of the chassis sled 36 from the retracted position to the extended position is shown in FIGS. 4 and 5, with this upward movement of the chassis sled 36 being represented by directional arrows 76 and 60 in FIG. 5. The upward movement of tubes 48 generates movement in lever arms 62 and wheel levers 72, as shown in FIG. 5.

Horizontal rods 71, 73 are mounted to the housing 12, rather than the chassis sled 36, and thus the horizontal rods 71, 73 do not move relative to the housing 12. As shown in FIG. 4, the wheel lever 72 is initially in contact the horizontal rod 73, and the lever arm 62 is in contact with the horizontal rod 71. As best shown in FIG. 5, the upward movement of chassis sled 36 causes the wheel lever 72 to contact the horizontal rod 73. As the chassis sled 36 continues to move upwardly, the horizontal rod 73 pushes outwardly on the wheel lever 72 thereby causing the wheel lever 72 to rotate in a direction indicated by directional arrow 80 shown in FIG. 5. This rotation causes lever arms 62 to pivot on the direction indicated by directional arrow 78 in FIG. 5. As the chassis sled 36 (and wheel lever 72) moves further upwardly, the wheel lever 72 loses contact with horizontal rod 73, and comes into contact with horizontal rod 71, which pushes the wheel lever 72 further outwardly and causes the wheels 14 to fully deploy. Movement of wheel lever 72 and lever arm 62 stops when the fender 74 contacts the lower inner wall of housing 12.

Once the wheels 14 have been fully deployed, the user may releasably lock the tubes 48 and vertical supports 24 to the housing 12 by engaging the locking mechanism 40 including a central cam knob 17 with a pair of rods 46 that extend laterally from opposite sides of the cam knob 17. Rotation of cam knob 17 to place the long axis of the cam between the heads of rods 46 compresses the springs 86 and drives the rods 46 outwardly and into holes 42 formed in vertical supports 24 and tubes 48 and thereby locks the chassis sled 36 to the housing 12. To unlock the chassis sled 36 from the housing 12, the cam knob 17 is rotated 90 degrees to 90 degrees to place the short axis of the cam between the heads of rods 46, thereby expanding the springs 86 to and withdraw rods 46 from holes 42 in the support tubes 24 and tubes 48.

In order to retract the chassis sled 12, the user unlocks the chassis sled 36 from the housing 12 and lowers the handle member 13, so that upper gripping portion 22 is received within recess 30 of receptacle portion 28. The downward movement of the handle 13 causes a downward movement of tubes 48. The downward movement of tubes 48 generates downward movement in the lever arms 62 and the wheel levers 72 with respect to housing 12, thereby causing the wheel levers 72 to pivot in a direction opposite that illustrated directional arrow 80 in FIG. 5. The fenders 74 cease pivotal movement when wheel levers 72 contact horizontal rod 73 and lever arms 62 once again rest on horizontal rod 71.

It should be further noted that fenders 74, in this retracted configuration, releasably cover and seal wheel openings 45, thus creating a continuous surface in rear wall 26, and protecting the wheels 14 from damage.

In the embodiment of FIG. 3B, the housing 12 is formed integrally within the piece of luggage 19. The lower wall 34 of housing 12 is removed, as housing 12 no longer receives luggage 16 or other cargo therein. Similarly, straps 18 have further been removed, since housing 12, in the embodiment of FIG. 3B, is mounted within luggage 19, rather than carrying the luggage externally thereon. The deployment and retraction of wheels 14 and handle 13 remain the same as the described above; however, luggage 19 preferably has a pair of openings 21 formed through a lower portion thereof, for the wheels 14 to selectively project therethrough. Similarly, an upper opening 31 is formed through an upper wall of luggage 19 for receiving handle 13.

In operation of one embodiment of the invention, there is a chassis with retractable wheels for luggage or a luggage carrier includes a housing, which defines an open interior region and an internal skeletal structure (i.e. the "chassis sled") which is slideably received within the open interior region of the housing. The chassis is configured so that the chassis sled is capable of moving axially upward and downward within the housing while the housing remains in a stationary position. The housing includes an upper portion and a lower portion, with the upper portion having a pair of handle openings formed therethrough and the lower portion having a pair of wheel openings formed therethrough.

The internal skeletal structure includes a pair of tubes, each having an upper end and a lower end, and a horizontal support bar mounted to, and positioned between, the lower ends of the pair of tubes. A pair of struts is mounted to the lower ends of the pair of tubes and extends downwardly and outwardly therefrom. Preferably, the struts are angled with respect to both the horizontal and vertical directions.

A mounting plate is joined to a lower end of each of the struts, and a lever arm is pivotally joined, at an upper end thereof, to each of the mounting plates. A wheel mount (which includes a wheel lever and axle) is pivotally mounted on a lower end of each lever arm. A rotatable wheel is mounted on the end of each wheel mount. The chassis further includes a handle with an upper gripping portion and a pair of vertical supports extending downwardly therefrom. The vertical supports extend through the pair of handle openings formed through the upper portion of the housing and are slidably received within the pair of tubes.

The wheels are deployed by axially sliding the chassis sled within the housing so that the housing remains stationary as the chassis sled is pulled upwardly (for example) within the housing. As the chassis sled moves upwardly within the housing, wheel lever arms attached to the chassis sled contact a pair of rods extending from the stationary housing. The rods cause the wheel lever arms to pivot and thereby push the wheels outwardly as the chassis sled moves upwardly. Once the wheels are fully extended, a locking mechanism holds the chassis sled in position relative to the housing.

The wheels may be retracted by unlocking the chassis sled from the housing and urging the chassis sled downwardly. As the chassis sled moves downwardly, the wheels are retracted. Once the wheels are fully retracted, the locking mechanism is engaged to lock the chassis sled in the retracted position relative to the housing.

The chassis (which includes the chassis sled and the housing) may be incorporated into the body of an article of luggage, such as a suitcase or trunk, or may be equipped with straps and a lower wall for use as a luggage carrier.

Figure 8:
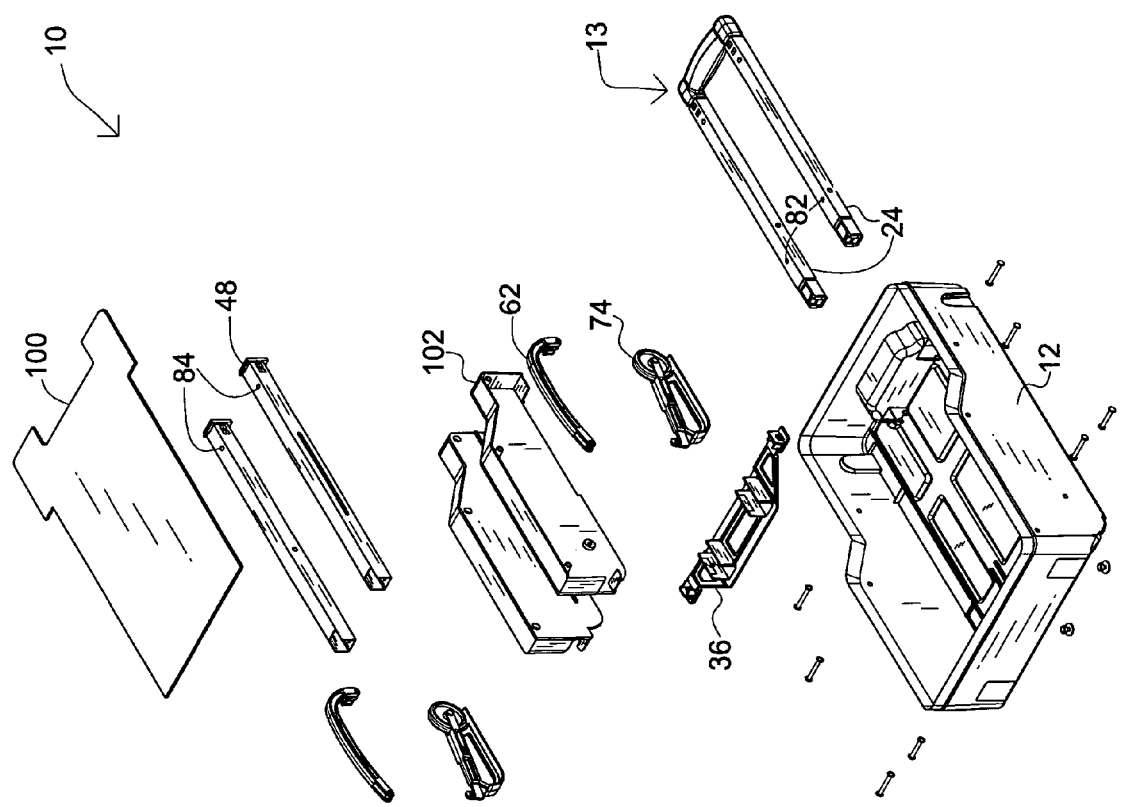
FIG. 8 is an exploded perspective view of a chassis with retractable wheels, according to one embodiment of the invention.

FIG. 8 illustrates a top perspective view of a chassis 10 with retractable wheels, according to one embodiment of the invention, wherein the chassis 10 includes a housing 12 and a chassis sled 36, wherein the chassis sled 36 is slideably disposed within the housing 12. The chassis 10 also includes a handle 13 having a pair of vertical supports 24. The pair of vertical supports 24 includes a pair of tubes 48 which slideably receive the vertical supports 24 of the handle 13. Each vertical support 24 has a projecting member 82 formed on a lower portion thereof, which is received within a corresponding slot 84 formed through a front surface of the respective tube 48. Each slot extends in a substantially longitudinal direction. The sliding engagement of projection members 82 with slots 84 formed through a front surface of the respective tube 48. Each slot extends in a substantially longitudinal direction. The sliding engagement of projection members 82 with slots 84 maintains proper alignment of handle 13 and prevents the accidental removal of handle 13 from chassis 10, limiting the travel of vertical supports 24 and handle 13 during both extension and retraction of the wheels.

The tubes 48 are coupled to the chassis sled 36, wherein the chassis sled 36 is pivotly coupled to a pair of lever arms 62. Each lever arm 62 is pivotally joined to a fender 74. The chassis further includes a separation panel 100 attached to the housing 12 configured to conceal the mechanical components of the chassis with retractable wheels. The chassis also includes a pair of panel covers 102, wherein the panel covers 102 is configured to conceal the mechanical components of the chassis with retractable wheels.

Figure 9:
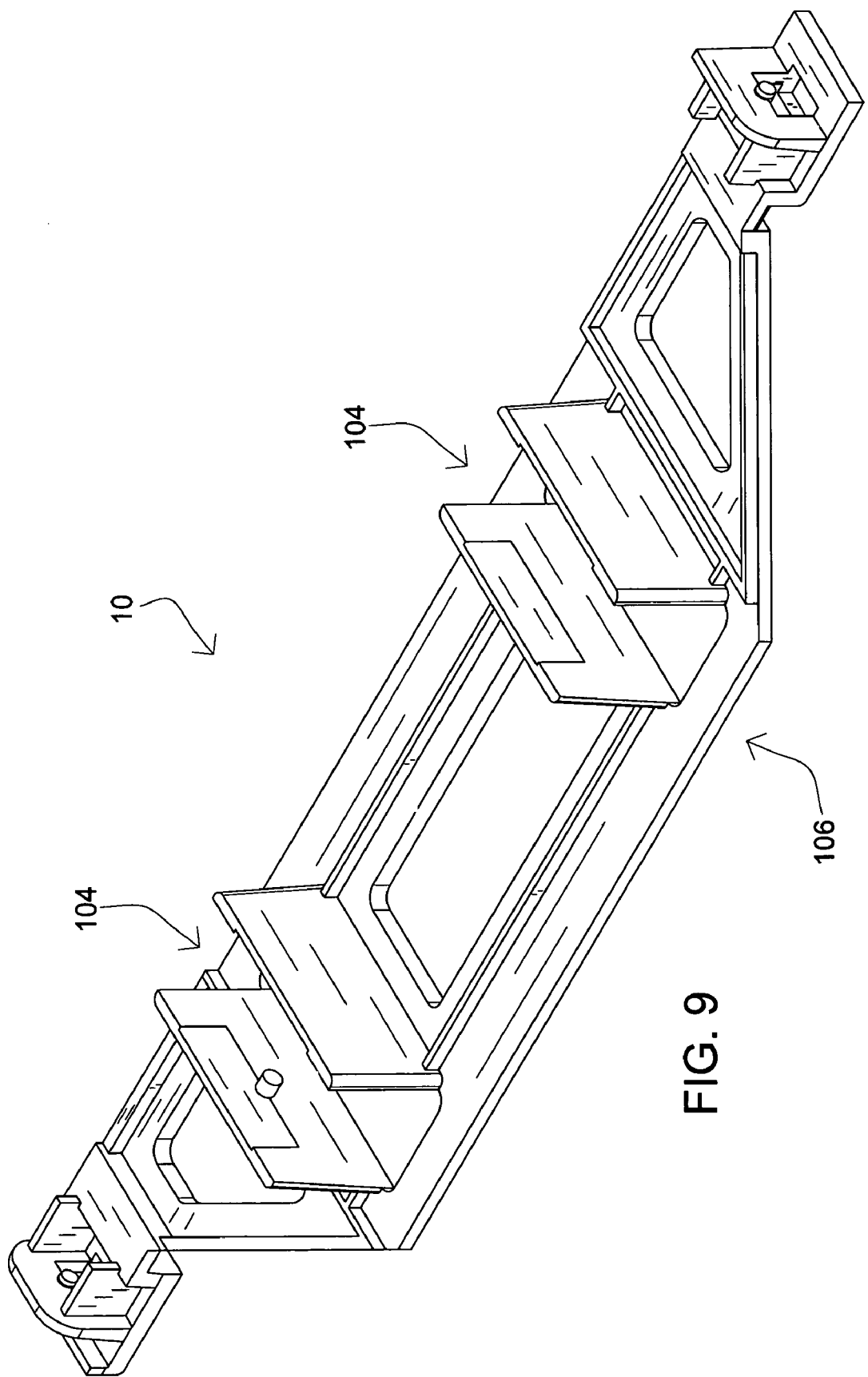
FIG. 9 is a top perspective view of a chassis sled of a chassis with retractable wheels, according to one embodiment of the invention.

FIG. 9 illustrates a top perspective view of a chassis sled 36 of a chassis with retractable wheels, according to one embodiment of the invention, wherein the chassis sled 36 includes a pair of receiving members 104 configured to pivotly attach to the first end of the pair of lever arms 62. The chassis sled 36 also includes an isosceles trapezoid configuration 106 defining a chassis sled 36 slideably disposed within the housing 12.

In operation of one embodiment of the invention, a user packs up a chassis with retractable wheels for luggage or a luggage carrier. The wheels are deployed by axially sliding the chassis sled within the housing so that the housing remains stationary as the chassis sled is pulled upwardly within the housing. Illustrated in FIG. 9, the chassis sled is much smaller and compact, wherein the chassis sled is configured within a small carry-on piece of luggage. The compact design of the chassis sled enables the vertical supports and the tubes to still extend and retract, wherein there is a smaller chassis for the chassis sled to slide about, since the piece of luggage is a small carry-on. As the chassis sled moves upwardly within the housing, wheel lever arms attached to the chassis sled contact a pair of rods extending from the stationary housing. The rods cause the wheel lever arms to pivot and thereby push the wheels outwardly as the chassis sled moves upwardly. Once the wheels are fully extended, a locking mechanism holds the chassis sled in position relative to the housing.

The wheels may be retracted by unlocking the chassis sled from the housing and urging the chassis sled downwardly. As the chassis sled moves downwardly, the wheels are retracted. Once the wheels are fully retracted, the locking mechanism is engaged to lock the chassis sled in the retracted position relative to the housing.

Figure 10:
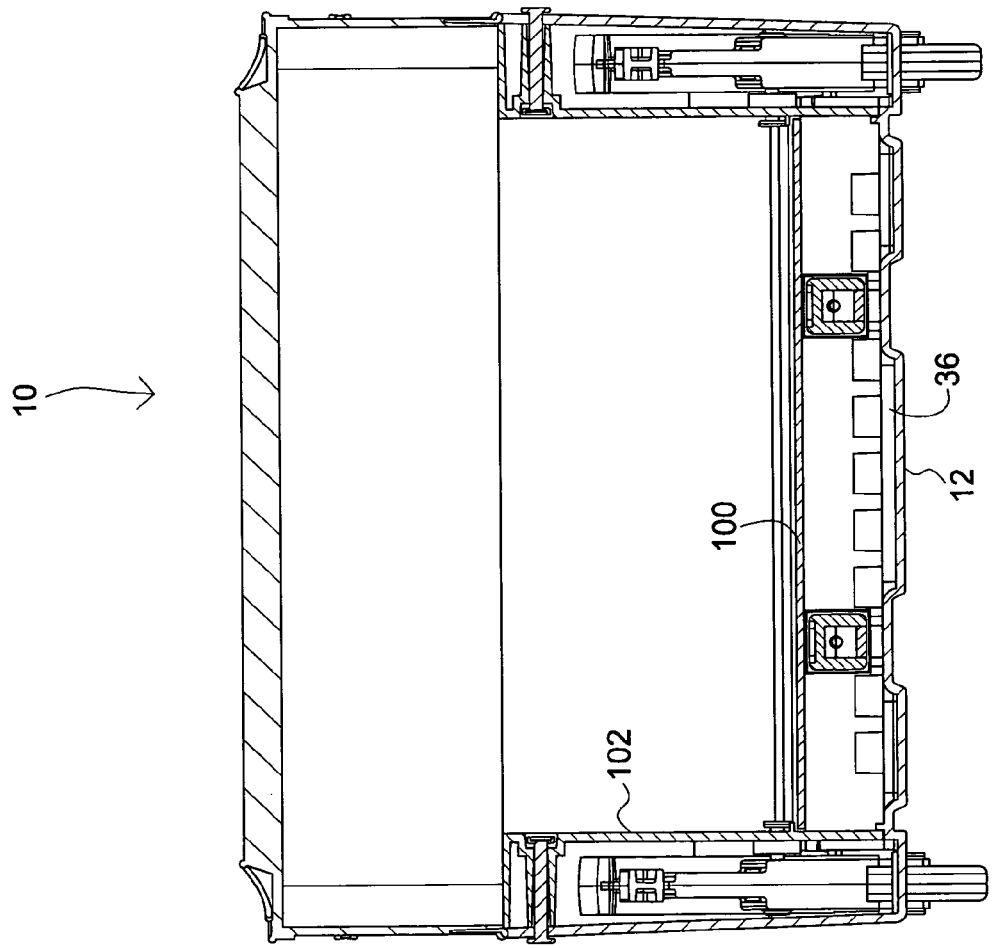
FIG. 10 is a side cross-sectional view of a chassis with retractable wheels, according to one embodiment of the invention.

FIG. 10 a side cross-sectional view of a chassis with retractable wheels, according to one embodiment of the invention, wherein the chassis 10 includes a housing 12 and a chassis sled 36, wherein the chassis sled 36 is slideably disposed within the housing 12. The chassis further includes a separation panel 100 attached to the housing 12 configured to conceal the mechanical components of the chassis with retractable wheels. The chassis also includes a pair of panel covers 102, wherein the panel covers 102 is configured to conceal the mechanical components of the chassis with retractable wheels.

Figure 11:
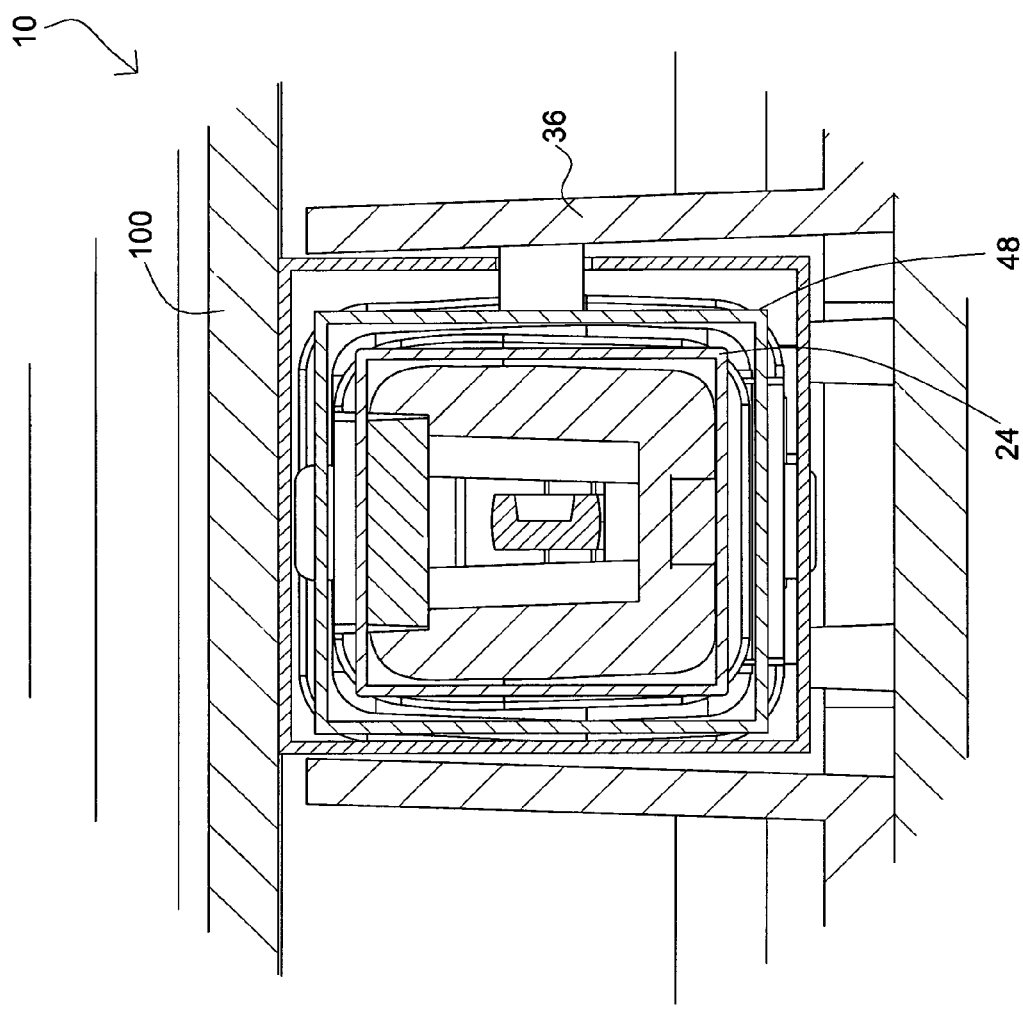
FIG. 11 is a cross sectional view of a portion of a chassis sled of a chassis with retractable wheels, according to one embodiment of the invention.

FIG. 11 illustrates a cross sectional view of a chassis sled of a chassis with retractable wheels, according to one embodiment of the invention, wherein the chassis includes a chassis sled 36. The chassis 10 also includes a handle 13 having a pair of vertical supports 24. The pair of vertical supports 24 includes a pair of tubes 48 which slideably receive the vertical supports 24 of the handle 13. The chassis further includes a separation panel 100 attached to the housing 12 configured to conceal the mechanical components of the chassis with retractable wheels.

In operation of one embodiment of the invention, a user packs up a chassis with retractable wheels for luggage or a luggage carrier. The wheels are deployed by axially sliding the chassis sled within the housing so that the housing remains stationary as the chassis sled is pulled upwardly (for example) within the housing. As the chassis sled moves upwardly within the housing, wheel lever arms attached to the chassis sled contact a pair of rods extending from the stationary housing. The rods cause the wheel lever arms to pivot and thereby push the wheels outwardly as the chassis sled moves upwardly. Once the wheels are fully extended, a locking mechanism holds the chassis sled in position relative to the housing.

The wheels may be retracted by unlocking the chassis sled from the housing and urging the chassis sled downwardly. As the chassis sled moves downwardly, the wheels are retracted. Once the wheels are fully retracted, the locking mechanism is engaged to lock the chassis sled in the retracted position relative to the housing.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate a piece of luggage attached or strapped to the chassis, one skilled in the art would appreciate that the piece of luggage may be attached to the chassis, wherein the luggage and the chassis are in one piece and still perform its intended function.

Finally, it is envisioned that the components of the device may be constructed of a variety of materials, such as but not limited to textiles, metal, metal alloys, plastic, plastic composite, rubber, rubber composite, etc. and still perform its intended function.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:
1. A chassis with retractable wheels, comprising:
 a) a housing defining a hollow interior and having a lower portion having a pair of wheel openings formed therethrough;
 b) a chassis sled slidably disposed within the housing;
 c) a pair of lever arms, each said lever arm being disposed in the lower portion of the housing, each of said lever arms having a first end pivotally attached to said chassis sled, and having a second end;
 d) a pair of mounting wheels, each said mounting wheel having a lower wheel, a fender configured to cover the wheels openings in a retracted position, and a web joining the fender to the wheel lever, the wheel levers having a first end pivotally attached to the second end of one said lever arm and having a second end;

e) an axle mounted to the second end of each of the wheel levers and a wheel mounted for rotation on each of the axles;
f) a pair of rods extending from the lower portion of the housing, the rods defining fulcrums for the wheel levers;
g) a handle assembly connected to said chassis sled;
h) a locking mechanism selectively locking said chassis sled to said housing, said locking mechanism having a locking position and an unlocked position; wherein the wheels pivot to an extended position outside the housing when the handle is pulled from the housing with the locking mechanism in the unlocked position, and pivot to a retracted position when the handle is pushed into the housing.

2. The chassis sled with retractable wheels described in claim 1, wherein said chassis sled comprises a pair of parallel tubes having elongated, axially extending slots defined therein, a cross member joining lower ends of the tubes, and wheel mounting struts extending from the lower ends of the tubes, each of said struts being connected to a said lever arm.

3. The chassis sled with retractable wheels described in claim 2, wherein said handle assembly has an elongated grip and vertical support tubes extending from opposite ends of the grip, each of the vertical support tubes having a projecting member slidable in the axially extending slot defined in said chassis sled tubes.

4. The chassis sled with retractable wheels described in claim 3, wherein said locking mechanism has a rotatable cam knob and spring biased lock rods disposed in the housing and extending to opposite sides of the cam knob, the knob having a locked position extending the lock rods through the vertical support tubes and the chassis sled tubes, and an unlocked position retracting the lock rods from the vertical support tubes.

5. The chassis sled with retractable wheels described in claim 4, wherein at least one side of said housing comprises a container abutting said housing.

6. The chassis sled with retractable wheels described in claim 5, wherein said container is a piece of luggage.

7. The chassis with retractable wheels described in claim 5, wherein the container is a piece of carry-on luggage.

8. The chassis sled with retractable wheels described in claim 4, wherein a base extends perpendicular from said housing.

9. The chassis sled with retractable wheels described in claim 8, further comprising a fastening means to secure cargo to said chassis.

10. The chassis sled with retractable wheels described in claim 9, wherein said fastening mean comprises at least one belt and said cargo comprises luggage.

11. The chassis with retractable wheels described in claim 1, wherein the chassis sled includes isosceles trapezoid configuration defining a chassis sled slideably disposed within the housing.

12. The chassis with retractable wheels described in claim 1, wherein the chassis sled includes a pair of receiving members pivotly attached to the first end of the pair of lever arms.

13. The chassis with retractable wheels described in claim 1, wherein the chassis includes a separation panel attached to the housing configured to conceal the mechanical components of the chassis with retractable wheels.

14. A luggage with retractable wheels, comprising:
a) an article of luggage having an upper wall, a lower wall and an open interior region, the lower wall having a pair of wheel openings formed therethrough, the upper wall having at least one handle opening formed therethrough;
b) a housing defining a hollow interior and having a lower portion having a pair of wheel openings formed therethrough, the housing being received within the open interior region of the article of luggage;
c) a pair of parallel tubes having elongated, axially-extending slots defined therein, a crossmember joining lower ends of the tubes, and wheel mounting struts extending from the lower ends of the tubes, wherein the tubes, crossmember and struts define a chassis sled slidably disposed with the housing;
d) a pair of lever arms disposed in the lower portion of the housing, the lever arms having a first end pivotally attached to the chassis sled struts and having a second end;
e) a pair of wheel mounts having a wheel lever, a fender configured to cover the wheel openings in a retracted position, and a web joining the fender to the wheel lever, each wheel lever having a first end pivotally attached to the second end of the lever arm and having a second end;
f) an axle mounted to the second end of each wheel lever, and a wheel mounted for rotation on each axle;
g) a pair of rods extending from the lower portion of the housing, the rods defining fulcrums for each of the wheel levers;
h) a handle assembly having an elongated grip and vertical support tubes extending from opposite ends of the grip, each of the vertical support tubes having a protecting member slidable in the slots defined in the chassis sled tubes; and
i) a locking mechanism having a rotatable cam knob and spring biased lock rods disposed in the housing and extending to opposite sides of the cam knob, the knob having a locked position extending the lock rods through the vertical support tubes and the chassis sled tubes, and an unlocked position retracting the lock rods from the vertical support tubes; wherein the wheels pivot through the wheel openings to an extended position outside the housing when the handle is pulled from the housing, and the wheels pivot to a retracted position when the handle is pushed into the housing.

* * * * *